United States Patent
Gormish et al.

[11] Patent Number: 6,073,118
[45] Date of Patent: Jun. 6, 2000

[54] METHOD FOR PERFORMING SECURE FINANCIAL TRANSACTIONS USING FACSIMILE TRANSMISSIONS

[75] Inventors: Michael J. Gormish, Los Altos; Peter E. Hart, Menlo Park; David G. Stork, Stanford; Gregory J. Wolff, Mountain View, all of Calif.

[73] Assignees: Ricoh Company, Ltd., Tokyo, Japan; Ricoh Corporation, Menlo Park, Calif.

[21] Appl. No.: 08/707,924
[22] Filed: Sep. 10, 1996
[51] Int. Cl.[7] .................................. H04L 9/00; H04N 1/44
[52] U.S. Cl. ......................... 705/39; 380/243; 380/51; 380/55; 705/64; 705/26; 705/40; 713/168; 713/189; 713/200; 713/201
[58] Field of Search .................... 380/9, 18, 23, 380/24, 25, 49, 50, 51, 55, 59, 243, 255, 287; 395/226, 235, 239, 240, 241, 242, 244; 705/50, 64, 73, 1, 26, 27, 30, 35, 39, 40; 713/150, 155, 168, 169, 170, 182, 189, 200, 201

[56] References Cited

U.S. PATENT DOCUMENTS

| | | | |
|---|---|---|---|
| 3,752,904 | 8/1973 | Waterbury | 380/24 X |
| 5,007,084 | 4/1991 | Materna et al. | 380/24 |
| 5,245,655 | 9/1993 | Buhn et al. | 380/18 |
| 5,671,285 | 9/1997 | Newman | 380/9 X |

FOREIGN PATENT DOCUMENTS

| | | | |
|---|---|---|---|
| 4432941 | 3/1995 | Germany | H04L 25/00 |

OTHER PUBLICATIONS

Printout of pages from the IBM Direct website on the Internet (http://www.ibm.com/Orders/), printed out on Oct. 29, 1997.

Glassman, et al., "The Millicent Protocol for Inexpensive Electornic Commerce", Published from the proceedings of the 4th International World Wide Web Conference, Dec. 1995, pp. 1–19.

*Primary Examiner*—Bernarr E. Gregory
*Attorney, Agent, or Firm*—Blakely, Sokoloff, Taylor & Zafman LLP

[57] ABSTRACT

Secure financial transactions may be made with insecure facsimile transmissions using encoded customer-specific information that can be readily decoded and confirmed by a merchant. The encoded information is affixed to an order form using, for instance, a label. The encoded information may include a serial number for use in confirming the order. Other information such as a card number (e.g., credit card) and expiration date may also be included.

22 Claims, 3 Drawing Sheets

METHOD FOR PERFORMING SECURE FINANCIAL TRANSACTIONS USING FACSIMILE TRANSMISSIONS

FIELD OF THE INVENTION

The present invention relates to the field of financial transactions; more particularly, the present invention relates to performing secure financial transactions using facsimile transmissions.

BACKGROUND OF THE INVENTION

Today, financial transactions such as credit card transactions, are performed either in person or over a communication link like a telephone. In the case of credit card or debit cards, the merchant receives a card number and an expiration date for the card and contacts a bank, credit card company or other financial institution to confirm the information of the card to verify its authenticity.

Merchants often use a VeriFone system (of Redwood City, Calif.) to obtain confirmation. The VeriFone system allows a merchant to automatically enter the necessary credit card information by swiping the card through a reader that reads the information from a magnetic strip on the card. Once read, the VeriFone system places a phone call to contact the institution to confirm the information. To merchants, the VeriFone system is very easy to use.

When the card holder is not present and wishes to make a credit card transaction, that individual typically contacts the merchant by telephone or by mail. Where time is a consideration, an individual will typically place a credit card order by phone. When making a credit card order by phone (or some other telecommunications medium), security becomes an issue because information is being sent on ordinary communications lines, which are typically not secure channels. Some unscrupulous individuals may intercept credit card information while it is being sent over the communication medium or even while at the merchant's place of business. What is needed is a way to perform secure credit card transactions using an insecure, communications medium.

Facsimile communication is a well-known communications technique. A facsimile transaction is generally not secure. A document may be encrypted prior to being sent to add security. However, the encryption scheme must be known by both the customer and the merchant so that the merchant is able to obtain the customer's information. For using such a system, the merchant and the customer may have to be very familiar with encryption technology, which is not the case. Also, ensuring that a merchant is able to decrypt a customer's document may require the customer and the merchant to have contact prior to placing an order. This prior contact may not be possible nor convenient. Furthermore, a merchant could not practically maintain a large number of different encryption schemes of various customers. However, if only a small number of encryption schemes are used, security may by compromised. Thus, in the prior art, the use of encryption with facsimile transactions has some drawbacks. It would be desirable to utilize a communication medium, such as facsimile communications, without requiring prior contact between a customer and a merchant, and with ease of use for both the customer and the merchant.

Changes could be made to communication systems to make them more secure. However, these changes usually require added costs and some downtime to the system to implement the changes. It would be advantageous to use existing communications hardware that does not have to be modified and is already in place.

The present invention provides for secure financial transactions. The present invention is easy to use for both the customer and the merchant and employs a system of existing telecommunications technology that does not have to be modified.

SUMMARY OF THE INVENTION

The present invention provides a method for performing financial transactions. The method of the present invention comprises receiving a facsimile transaction. The facsimile transaction includes encoded customer-specific information, much like a credit card number and an identification number. The present invention further comprises decoding the encoded customer-specific information and confirming the decoded customer-specific information.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
FIG. 1 is an enlarged version of one embodiment of a label of the present invention.
Figure 1:
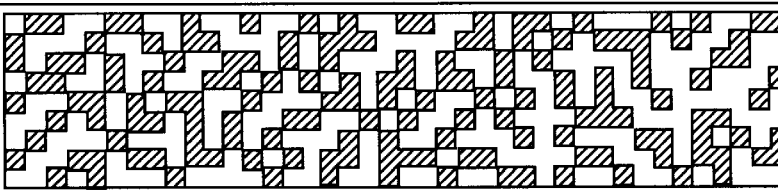
Figure 1:
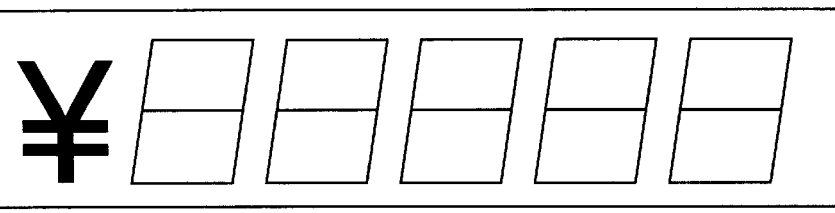
Figure 1:
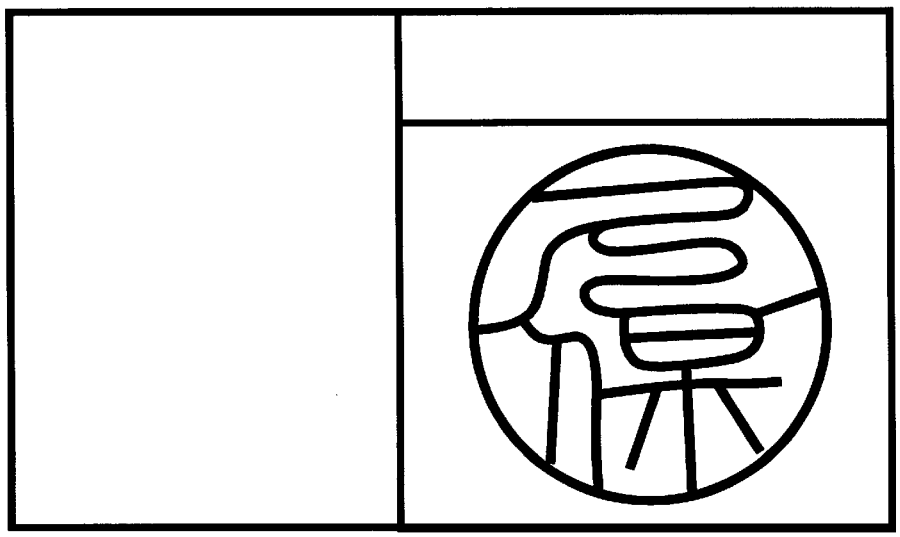

A method for performing secure financial transactions using facsimile transmissions is described. In the following description, numerous details are set forth, such as encryption schemes, types of customer specific information, etc. It will be apparent, however, to one skilled in the art, that the present invention may be practiced without these specific details. In other instances, well-known structures and devices are shown in block diagram form, rather than in detail, in order to avoid obscuring the present invention.

Overview of the Present Invention

The present invention allows a consumer to transact secure financial purchases with merchants using an unmodified facsimile machine on ordinary (insecure) phone lines. Security is provided for these transactions by the customer's use of pre-printed labels or forms containing encoded, customer-specific information needed to complete a credit card transaction. Any credit card transaction using a facsimile machine initiated by the customer includes one of the labels. The encoded, customer-specific information can be readily decoded and confirmed by the merchant in a manner similar to a VeriFone phone call.

Labels of the Present Invention

The labels of the present invention comprise encoded, customer-specific information required to perform a financial transaction. The encoded customer-specific information may also be provided on a form that a customer uses and fills out to place an order. The distinction between forms and labels is merely one of physical size. A label may be relatively small and could be affixed to any conveniently-sized paper by the customer. A form would have pre-printed information in one area, while the remainder of the paper is available for the customer's use. For the following discussion, the term "label" may also comprise a form.

In one embodiment, the information encoded on the label includes the customer's account number and expiration date, and a serial number unique to each individual label. In the present invention, the serial number serves two purposes. First, in one embodiment, the serial number provides an important level of security because once the label is used, a label will be rejected by the verifying location (e.g., bank, credit card company, financial institution, verification clearinghouse, etc.) if an attempt is made to use it again. Thus, to that extent, if a serial number is used, the label is non-reusable, which offers powerful security. Secondly, the bank that issues the labels (or the company that provides the label-making equipment) is assured the customers will return for more labels. Simply copying a label and reusing it is not possible.

Optionally, other supplementary information may be encoded on the label. Additional information included may comprise a maximum allowable transaction amount, the customer's normal shipping address, and/or a marker (e.g., hanko) that serves to identify the customer. In one embodiment, the customer's normal shipping address is only included in the code string to protect the user's location.

In one embodiment, the labels are generated by the verification entity. That is, the same bank, credit card company, financial institution, etc., that confirms the information for a purchase is also the same entity that generates the labels. There is no need for the customer to perform computations, encode nor encrypt information.

In one embodiment, the labels are generated using a two step process that includes first generating a numeric or alphanumeric string that encodes the customer-specific information, such as a card number (e.g., credit card number), expiration date and serial number. For this, any cryptographic method may be used. Encryption methods are available in software executable on computer system and are well-known in the art.

The same entity (the bank, credit card company, or similarly trusted agency) is both the sender and receiver of the encrypted information, thereby eliminating any coordination of encryption methods between the customer and the merchant. Also, using the present invention, there is no need to pass any information other than the amount and the merchant.

After the unique string has been generated, the labels are printed with the code string in the form of digital paper. In one embodiment, digital paper is printed on the labels in the same format as that disclosed in U.S. Pat. No. 5,337,362, entitled "Method and Apparatus for Placing Data onto Plain Paper," issued Aug. 9, 1994, which is incorporated herein by reference. In an alternate embodiment, other digital paper techniques may be used such as glyph-based product of Xerox Corporation, Stamford, Conn. Note that other encryption and formatting techniques may be used to place the data onto the paper in a manner unreadable to humans (a machine readable format).

In one embodiment, the serial number is not encoded. However, the serial numbers are unique. By using a serial number with a large number of digits and/or letters, the chance to randomly guessing the serial number greatly diminishes, thus providing security in itself. In one embodiment, no encryption is performed. In such a case, customer-specific information is placed directly onto the label.

In one embodiment, the encoded customer-specific information in the form of a string may be printed onto the label without having the string converted into digital paper. Note that the code stream may be printed as a series of binary ones and zeros without the need of the digital paper. However, digital paper adds for increased security and reliability of automated reading.

In one embodiment, the code string may be printed on the label in both numeric and digital paper form. By doing so, manual entry of the information may be performed if necessary.

Because of the encoding, and also because of the digital paper formatting of the code string, any person who intercepts the facsimile information, whether by tapping phone lines or simply working in the merchants facility, cannot learn anything from the coded string.

In addition to the pre-printed information, the label may also include a space for the customer's signature and/or a distinctive marker, such as a hanko. Extra security may be provided by signature matching or marker (hanko) matching. A bank or credit card company authorizing a transaction could check the signature visually against their own records if they wished. The marker (hanko) may also be coded and printed on the label in digital paper form. Allowing the customer to provide their signature helps safeguard the utility of a packet of labels should they be physically stolen or lost. For example, if labels are lost or stolen, the customer may verify at least after the fact that a forged signature is not his own.

Additionally, the label could be printed with boxes to encourage the customer to make a transaction amount recognizable by optical character recognition (OCR) system.

Labels may also include corporate logos or other attractive backgrounds such as is done with personal checks.

FIG. 1 illustrates one embodiment of the label of the present invention. Referring to FIG. 1, a label is shown with unique serial number 101, a code string in numeric and digital paper form 102, OCR boxes for a transaction value 103 and a signature, date and hanko block 104. Also note that a corporate logo has been included. No rights to the corporate logo or any other registered trademark are relinquished by the corporate assignee of the present invention by their inclusion here, and the owner of such trademarks reserves all rights.

The Secured Financial Transaction of the Present Invention

Figure 2:
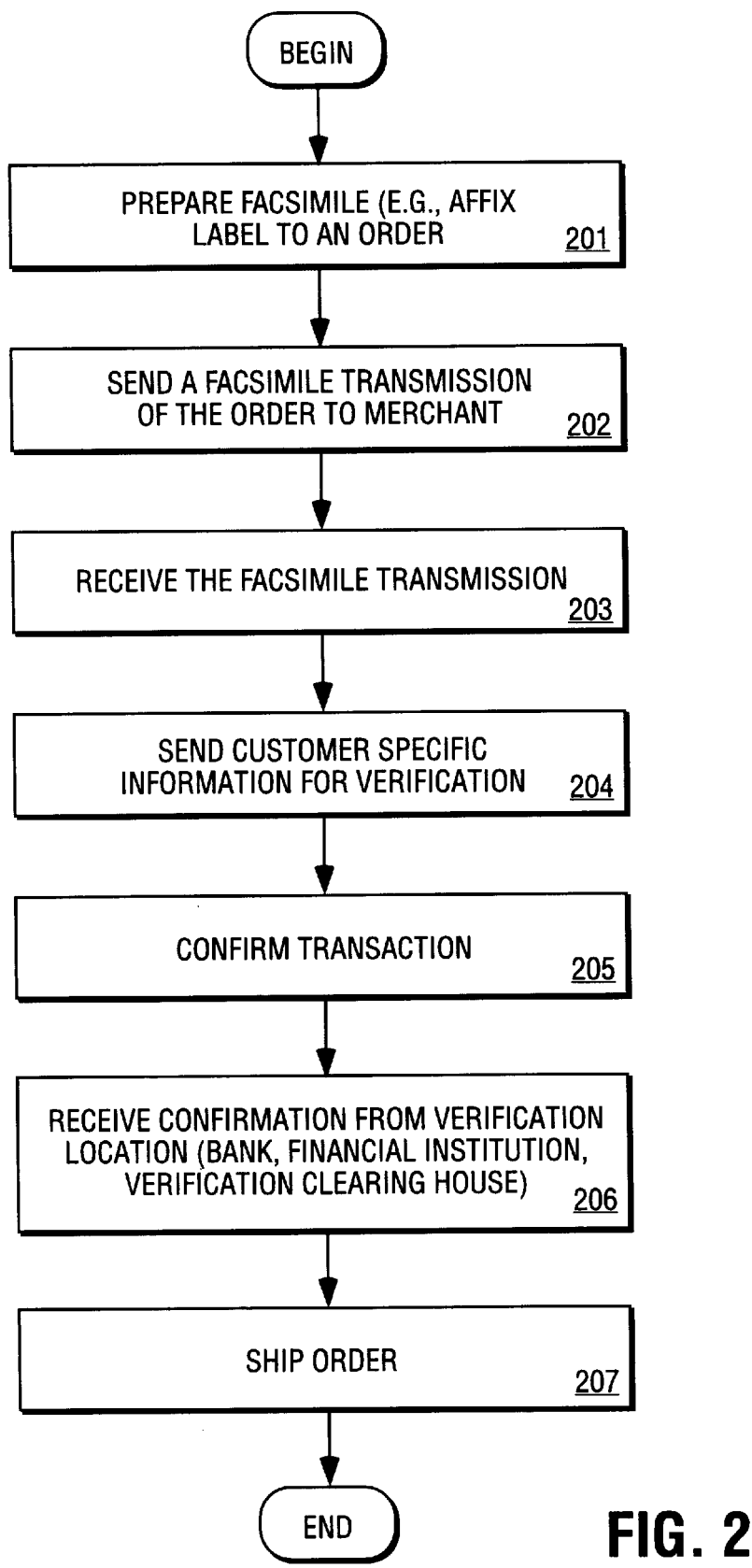
FIG. 2 is one embodiment of the secure financial transaction process of the present invention.

One embodiment of the process for making a secured financial transaction is shown in FIG. 2. Referring to FIG. 2, when a customer desires to transact a purchase via facsimile from a merchant, a facsimile (fax) is prepared containing the customer's request which includes a description of the items to be purchased, a shipping address, etc., and the customer affixes a not previously used label (processing block 201). When the fax is completed, the customer sends the fax to the merchant (processing block 202).

The merchant receives the facsimile transmission (processing block 203) and sends the customer-specific information for verification (processing block 204). In one embodiment, the receiving merchant reads and forwards, via telephone, the encoded customer-specific information on the label to the verifying location (e.g., bank, credit card company, financial institution, verification/confirming clearinghouse) that normally confirms the in-person transactions. In one embodiment, the verification location is the sole party responsible for decoding the information. The merchant may use a scanner which reads the digital paper information in a similar manner to a magnetic strip being read on a back of the credit card using a VeriFone system. The merchant may have OCR software which reads the transaction amount using optical character recognition. In this manner, the merchant does not have access to any specific customer information other than possibly a shipping address.

In an alternate embodiment, the merchant has a scanner which can read in and decode some or all of the customer-specific information. In such a case, the merchant forwards the customer-specific information to the verifying location.

Once the information is received, the verification location confirms the transaction (processing block 206). The confirmation may comprise the verifying entity searching a large database of authentic serial numbers to determine if the serial number being verified matches one of the serial numbers in the database. Such a database may dynamically grow. Once a match is found, a confirmation signal or indication may be generated or asserted.

In one embodiment, the label includes some information which may be decoded by the merchant while leaving other information only decodable by the verification location. This information may include the phone number to the verification location, customer address information, or other information that requires less security.

Next, the merchant receives confirmation from the verification location (processing block 206). Upon receiving confirmation, the transaction is completed and the merchandise is shipped to the customer (processing block 207).

In an alternative embodiment, the merchant when receiving a faxed order manually enters the string of digits to the bank or credit card company. However, because the manual entry is error prone, the VeriFone-like "swipe" of the digital information that automatically reads the information and transmits it by telephone is preferred.

Additionally, the merchant may fax back to the customer a copy of the original order with a confirmation number as provided by the bank or credit card company using address information encoded on the label.

The system supporting the financial transaction process of the present invention includes a facsimile machine used by the customer. The facsimile machine may be part of a larger system, such as a personal computer. The facsimile machine is coupled to merchant facsimile machines, via one or more communication links or networks, which may comprise telephone lines. The merchant may have a scanner that reads in the digital paper information or the encoded string, and/or other information such as the transaction amount. The scanner may perform OCR (may run OCR software) to read in the encoded string, transaction amount, etc. The facsimile machine and scanner used by the merchant may be part of the same system (e.g., a computer system). The scanner of the merchant may have communications hardware and/or software to contact the verification location, similar to that of a VeriFone system.

In one embodiment, a user with a personal computer may be able to generate the labels or forms necessary to transact such business. The user must have the digital paper software or other type of encryption/encoding software discussed above. In one embodiment, reassignment of serial numbers is performed at the host financial institution.

In one embodiment, the user may contact the bank directly through the personal computer and obtain the necessary serial number information from the bank or other financial institution to enable the printing labels at home. Further, the user may be able to contact the bank or financial institution to get approval for a certain transaction amount and to allow the customer to print out money in the form of a label at home that may be used as cash with the merchant. Then, at the merchant's location, the label operates as a charge slip which the merchant may input into the fax machine and receive verification. Thus, in a manner similar to a debit card transaction, the customer uses "faxed" cash, which is secure.

Figure 3:
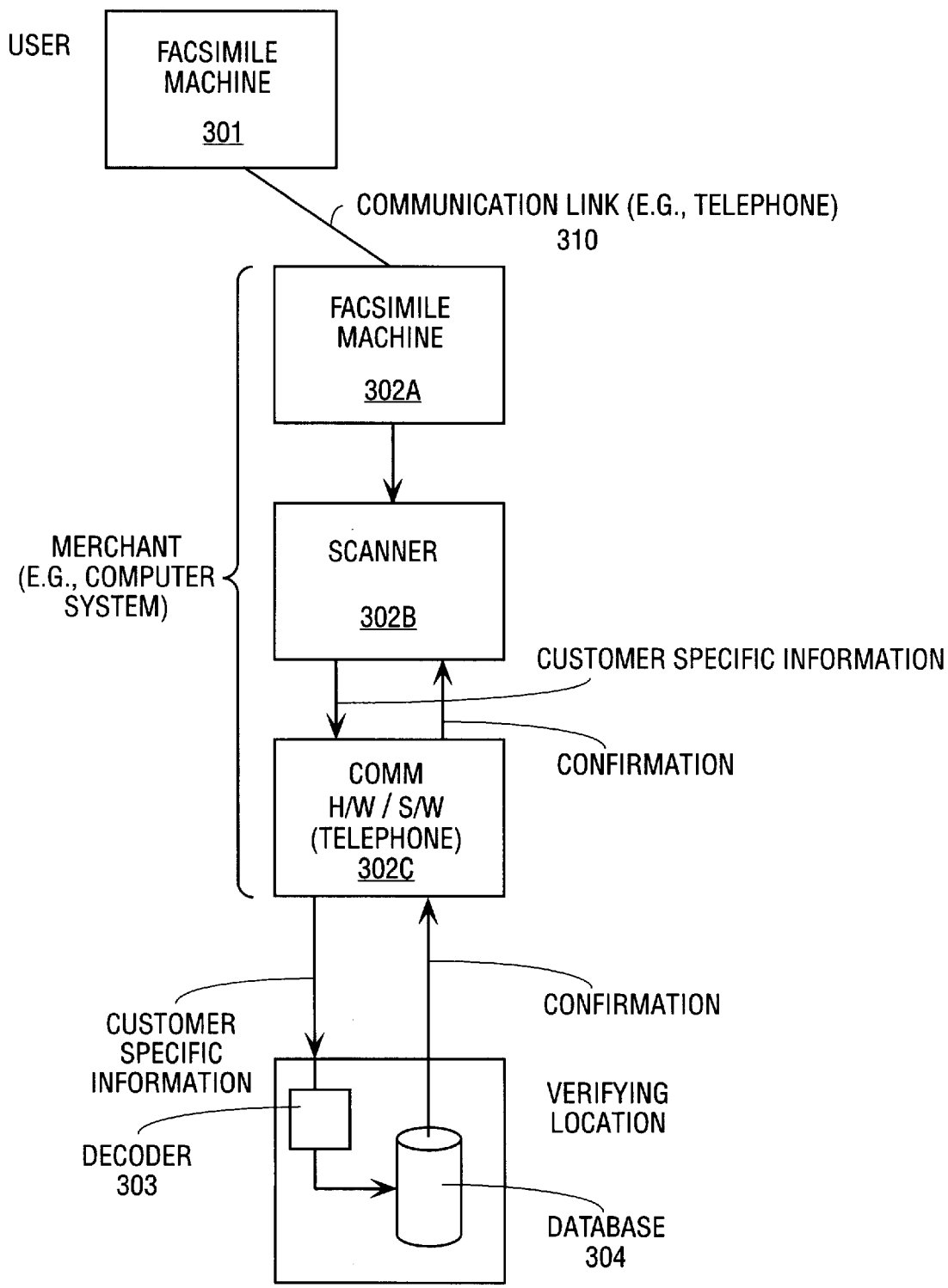
FIG. 3 illustrates one embodiment of a system for performing financial transactions.

FIG. 3 illustrates one embodiment of a system for performing financial transactions. Referring to FIG. 3, a user of a facsimile machine 301 can communicate with a merchant over a communication link 310 (e.g., telephone). At the merchant location, a facsimile machine 302A receives a facsimile from the user and feeds the received document to a scanner 302B which scans the document to obtain encoded customer specific information. The merchant location includes communication hardware and software 302C (e.g., telephone communications hardware and software) which sends the encoded customer specific information to a verifying location. The communication hardware and software may be a part of the scanner 302B and may contact the verification location similar to that of a VeriPhone system. The verifying location includes a decoder 303 that decodes at least a portion of the encoded customer specific information. The decoded customer specific information includes a serial number which is forwarded to a database 304. Database 304 compares the serial number to serial numbers contained stored therein. The serial numbers in the database may include serial numbers of previous transactions. The database 304 generates a confirmation signal or other indication based on the whether or not the serial number is on the list of serial numbers that have already been used in a previous transaction. In one embodiment, the confirmation signal is sent back to the merchant to indicate that the financial transaction may proceed. If the serial number is on the list of serial numbers of previous transactions, the confirmation signal will indicate that the transaction is not confirmed, thereby rejecting the financial transaction based on the presence of the serial number on the list of previously used serial numbers.

Whereas many alterations and modifications of the present invention will no doubt become apparent to a person of ordinary skill in the art after having read the foregoing description, it is to be understood that the particular embodiment shown and described by way of illustration is in no way intended to be considered limiting. Therefore, references to details of the preferred embodiment are not intended to limit the scope of the claims which in themselves recite only those features regarded as essential to the invention.

Thus, a method for performing secure financial transactions has been described.

We claim:

1. A method for performing financial transactions comprising:

receiving at a merchant location a facsimile transmission of a document having encoded and encrypted, customer-specific information that includes an identification number unique to a document and includes an order for the merchant;

sending from the merchant location at least a portion of the customer-specific information to a verification location apart from the merchant location; and receiving a verification at the merchant location from the verification location that said at least a portion of the encoded customer-specific information has been decrypted, decoded, and verified to confirm the decoded customer-specific information.

2. The method defined in claim 1 where the financial transactions comprise credit card transactions.

3. The method defined in claim 1 wherein the encoded customer-specific information is formatted onto a label affixed to the document.

4. The method defined in claim 1 where the encoded customer-specific information further comprises a credit card number.

5. The method defined in claim 1 wherein the encoded customer-specific information comprises a maximum transaction amount.

6. The method defined in claim 1 wherein the customer-specific information includes a distinctive marker identifying a person.

7. A method for performing a financial transaction comprising the steps of:

generating a string that comprises an encoded and encrypted representation of customer-specific information that includes a unique serial number;

affixing the string to a document with an order;

sending a facsimile transmission comprising the document with the affixed string and the order;

receiving the facsimile transmission at a merchant location;

sending the string to a verification location;

decrypting and decoding the string at the verification location; and confirming the financial transaction.

8. The method defined in claim 7 wherein the string is a numeric string.

9. The method defined in claim 7 wherein the string is an alphanumeric string.

10. The method defined in claim 7 where the string further comprises a credit card number.

11. The method defined in claim 7 wherein the string further comprises an expiration date.

12. The method defined in claim 7 further comprising generating a label containing the string and affixing the label to the document.

13. The method defined in claim 12 wherein the label comprises a signature area for a signature of a customer.

14. The method defined in claim 7 wherein the encoded customer-specific information is also encrypted, and further comprising the step of decrypting said at least a portion of the customer specific information at the verification location.

15. A method for performing a financial transaction comprising: generating a string that comprises an encoded and encrypted representation of customer-specific information that includes a unique serial number, wherein the encoded representation of customer-specific information comprises a distinctive marker identifying a person;

affixing the string to a document with an order;

sending a facsimile transmission comprising the document with the affixed string and the order;

receiving the facsimile transmission at a merchant location;

sending the string to a verification location;

decrypting and decoding the string at the verification location; and confirming the financial transaction.

16. A method for performing a financial transaction comprising:

generating a string that comprises an encoded representation of customer-specific information that includes a unique serial number;

affixing the string to a document with an order;

sending a facsimile transmission comprising the document with the affixed string and the order;

receiving the facsimile transmission at a merchant location;

sending the string to a verification location;

decoding the string at the verification location; and confirming the financial transaction, wherein confirming the financial transaction comprises comparing the serial number to a list of serial numbers, wherein the list of serial numbers comprises a list of serial numbers of previous transactions; and rejecting the financial transaction based on whether or not the serial number is on the list has already been used in a previous transaction.

17. A method for performing a credit card transaction comprising:

generating a string that comprises an encoded representation of credit card number, a distinctive marker identifying a person, and a unique serial number;

affixing the string to a document with an order; and sending a facsimile transmission comprising the document with the affixed string and the order;

receiving the facsimile transmission at a merchant location;

sending the string to a verification location;

decoding the string at the verification location;

confirming the financial transaction, wherein confirming the financial transaction comprises comparing the serial number to a list of serial numbers, wherein the list of serial numbers comprises a list of serial numbers of previous transactions; and rejecting the financial transaction based on whether or not the serial number is on the list has already been used in a previous transaction.

18. A system for performing financial transactions comprising:

means for sending a facsimile transmission of a document having encoded, customer-specific information that includes an identification number unique to the document;

means for receiving the facsimile transmission;

means for sending at least a portion of the customer-specific information to a verification location;

means for decoding said at least a portion of the encoded customer-specific information at the verification location; and means for verifying the decoded customer-specific information to confirm the decoded customer-specific information, wherein the means for verifying comprises:

means for comparing the serial number to a list of serial numbers, wherein the list of serial numbers comprises a list of serial numbers of previous transactions; and means for rejecting the financial transaction based on whether or not the serial number is on the list has already been used in a previous transaction.

19. The apparatus defined in claim 18 where the financial transactions comprise credit card transactions.

20. The apparatus defined in claim 18 wherein the encoded customer-specific information is formatted onto a label.

21. The apparatus defined in claim 18 where the encoded customer-specific information comprises a credit card number.

22. The apparatus defined in claim 18 wherein the encoded customer-specific information comprises a maximum transaction amount.

* * * * *